Figure 1:
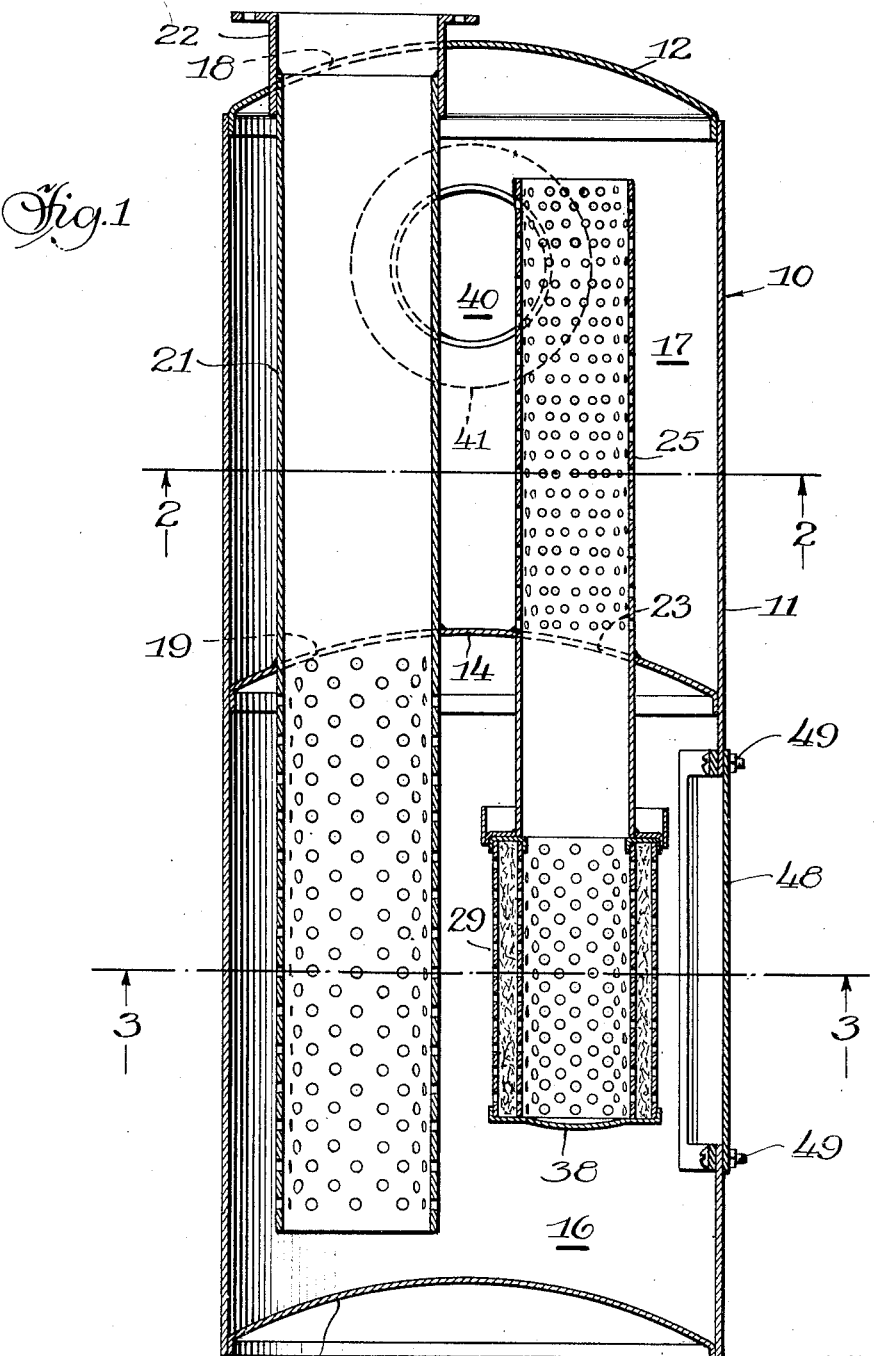

May 15, 1951          H. A. DIETRICH          2,553,306
APPARATUS FOR SILENCING AND FILTERING NOISE PRODUCING GASES
Filed Aug. 16, 1946          3 Sheets-Sheet 1

INVENTOR.
Helmut A. Dietrich
BY
Tesch and Darbo Attys.

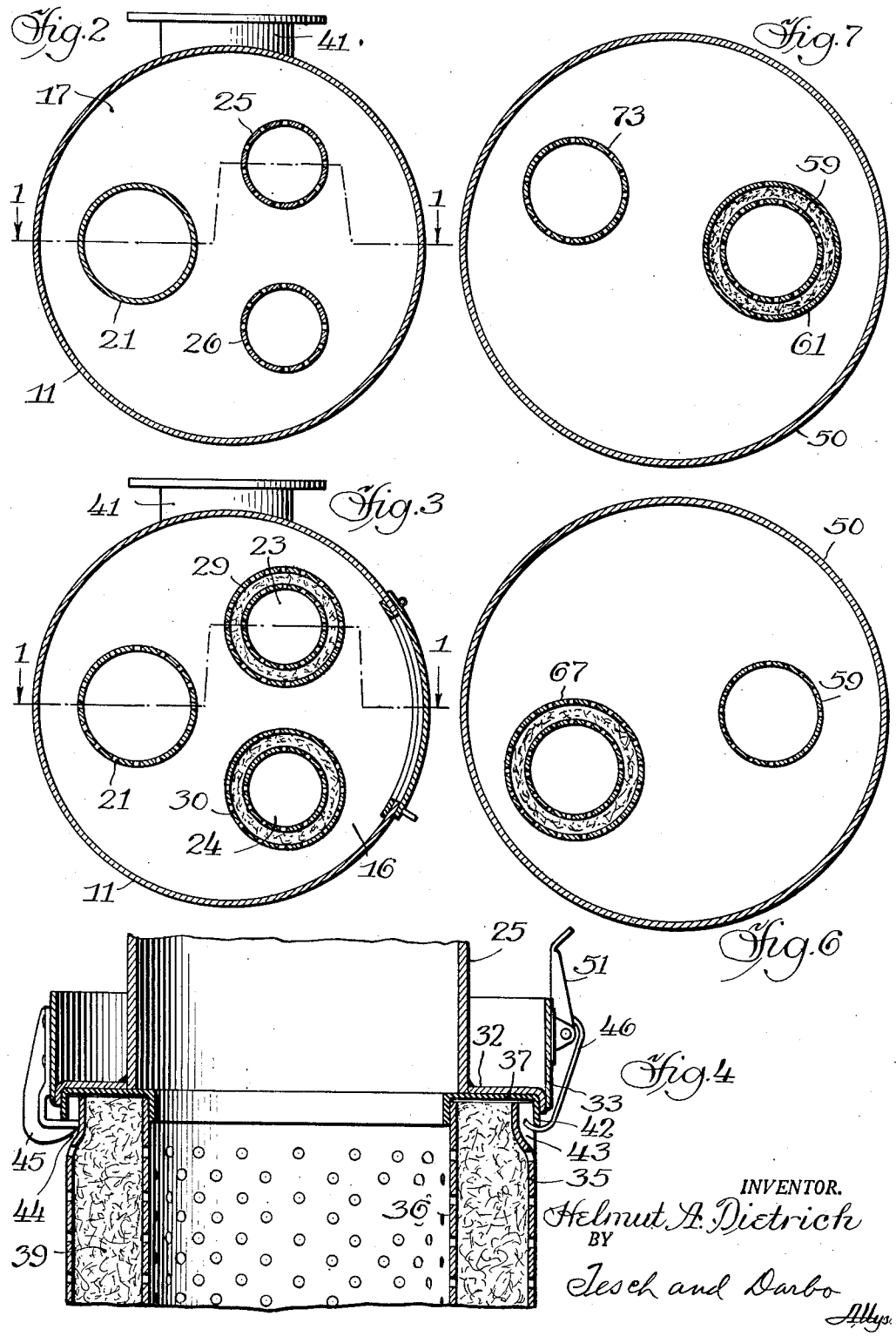

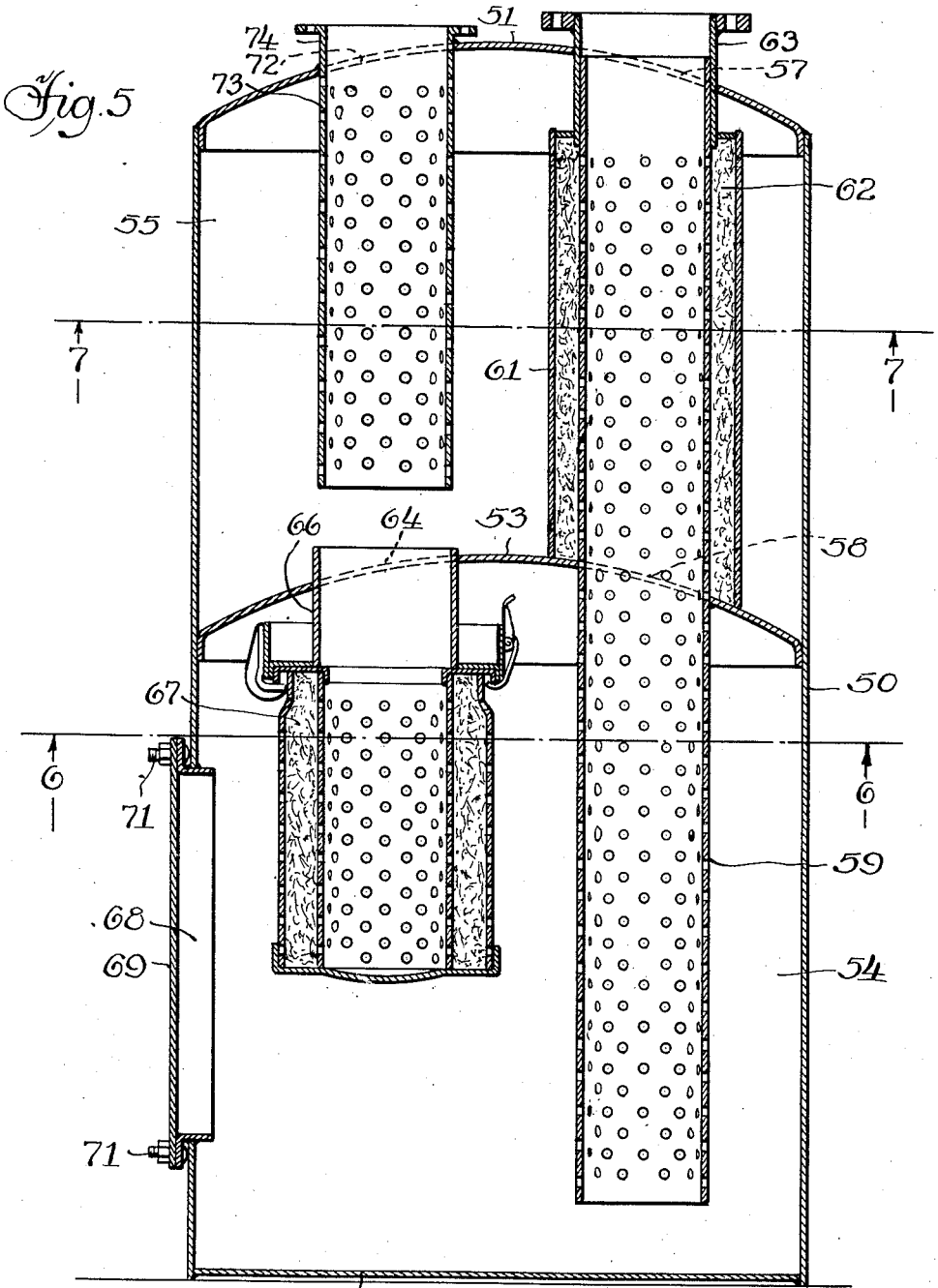

Patented May 15, 1951

2,553,306

UNITED STATES PATENT OFFICE 2,553,306

APPARATUS FOR SILENCING AND FILTERING NOISE PRODUCING GASES

Helmut A. Dietrich, Newark, Ohio, assignor to Burgess-Manning Company, Chicago, Ill., a corporation of Illinois Application August 16, 1946, Serial No. 690,975

11 Claims. (Cl. 183—44)

1

This invention relates to apparatus for silencing and filtering noise producing pulsating gases and particularly the intake noises of internal combustion engines, pumps, blowers and other equipment, and for filtering the gases going into the intake. In most applications, the gas upon which the apparatus operates is air, but it may be used with other gases as well.

It is an object of the invention to provide apparatus of the character described which is simple and economical in structure and in which the silencing means are so arranged that they assist the filtering means in performing their function.

More specifically, the object is to provide apparatus of the character described in which the silencing means have the effect of snubbing the pulsations present in the gases passing to the filter, with the result that they flow through the filter in a relatively steady stream and the filter performs its function more effectively.

Other objects and advantages will become apparent as the following description progresses, which is to be taken in conjunction with the accompanying drawings, in which:

Fig. 1 is a longitudinal sectional view of an apparatus in accordance with the invention; taken along broken line 1—1 of Fig. 2;

Figs. 2 and 3 are transverse sectional views taken along lines 2—2 and 3—3 of Fig. 1, respectively;

Fig. 4 is an enlargement of a portion of the view shown in Fig. 1, showing the mounting for the filters;

Fig. 5 is a longitudinal sectional view of a different embodiment of the invention with the conduit 73 and filter 67 revolved into the plane of the section; and Figs. 6 and 7 are transverse sectional views, taken along lines 6—6 and 7—7 of Fig. 5, respectively.

The structure of Figs. 1, 2, 3 and 4 consists of a cylindrical shell 10 having cylindrical wall 11 and forward and rearward end walls 12 and 13, and a transverse partition 14 dividing the interior thereof into two chambers 16 and 17. End walls 12 and 13 and partition 14 are shown as being dished in shape, but they may be planar if desired. Unless otherwise specified, the parts are suitably fastened together, as by welding. Although the device may be oriented as desired, it is especially adapted for arrangement with its longitudinal axis extending vertically and end wall 13 at the bottom. End wall 12 has an opening 18 therein which serves as an inlet for the

2 device, and partition 14 has an opening 19 therein in alignment with opening 18, and an open ended conduit 21 is connected at one end thereof to opening 18 and passes through the chamber 17 and opening 19 and extends into the chamber 16 and stops short of the end wall 13. A snout 22 may be connected to the end of conduit 21 and is adapted to be connected to a conduit or other means for the conveyance of the gas to the device. The portion of conduit 21 located within chamber 16 is apertured as shown.

Two additional openings 23 and 24 are provided in angularly spaced apart relationship in partition 14, and open ended conduits 25 and 26 extend through said openings and into chambers 16 and 17. The portion of conduit 25 extending forwardly from opening 23 into chamber 17 is apertured and stops short of the end wall 12. While considerable latitude is permissible in the number, size, shape and aggregate area of the apertures in conduits 21 and 25, it is preferred that round openings do not exceed ¼ inch in diameter, that elongated slots do not exceed ¼ inch in width and that the aggregate area of the apertures in each conduit does not exceed the cross sectional area of the conduit. The portion of conduit 25 extending downwardly from opening 23 into chamber 16 is relatively short and the wall thereof is imperforate. A gas filter 29 is mounted within chamber 17 upon the end of conduit 25. For the mounting of the filter 29, the lower end of conduit 25 is provided with an outwardly extending flange 32 which has a rim member 33 attached to the periphery thereof and extending upwardly and downwardly therefrom. The filtering member 29 extends downwardly from the flange 32, and is of annular shape and consists of spaced apart outer and inner cylindrical retaining members 35 and 36 which are foraminous for the ready passage of gas therethrough and may be composed of screen, perforated sheet metal, or the like. The retaining members 35 and 36 are fixed in their spaced apart relationship at their upper ends by the base ring 37 which is fastened to the end portions of the retaining members and rests against the flange 32. The retaining members are fixed in a similar manner at their lower ends by an imperforate cap member 38, which provides a complete closure for the end of the filter. Within the annular space defined by the retaining members 35 and 36, base ring 37 and the cap 38, is arranged a gas pervious body 39 of filtering material, which may be of any suitable construction, such as wavy strand material of fibrous or metallic composition, the gimped strand material described in U. S. Patent 2,122,582, or the knitted strand material described in U. S. Patent 1,676,191, or the like.

At its outer periphery, the base ring 37 has a downwardly extending flange 42, and the upper end portion of the outer retaining member 35 is locally bent inwardly upon the opposite sides of the filter to form the recesses 43 and 44. A hook member 45 has its base portion rigidly attached to the outer surface of the rim 33 and its hook portion extending into the recess 44 and engaging the lower edge of flange 42. In a similar manner, toggle clamp 46 is mounted rigidly upon the outer surface of rim 33 at a portion thereof opposite to hook 45, and has its clamping end extending into recess 43 and tightly engaging the lower edge of flange 42. In this manner, the filter 29 is firmly mounted upon the end of conduit 25 and gases passing from chamber 16 into said conduit must pass through the said filter 29.

The filter is adapted to be removed and reinserted for cleaning purposes. A removable panel or door 48 is provided in the cylindrical wall 10 to afford access to the filters 29 and 30. The door 48 is removably fastened in place by means of the bolts 49. The filter is installed by tilting it slightly so that the edge of the flange 42 passes above the hook 45, and it is then straightened into alignment with the conduit 25 and the toggle clamp 46 is closed upon the edge of the flange 42 to fix the filter in place. To remove the filter, the reverse procedure is followed.

A second filter 30 is mounted upon the end of conduit 26, the construction and arrangement of conduit 26 and filter 30 being similar to that of conduit 25 and filter 29.

The cylindrical wall 11 has an opening 40 therein communicating with chamber 17 and serving as an outlet for the device. A flanged snout 41 may be connected to the opening 40 and is adapted to be connected to the intake of the engine, pump, blower, etc. to which the apparatus is to be applied.

In operation, air enters by way of the inlet opening 18 and passes through the apparatus and leaves by way of the outlet opening 40 and thence enters the pump, blower, etc. It is induced to pass through the apparatus by the engine, etc., and because of the characteristic intermittent induction of the air by such devices, it does not flow in a steady stream, but in the form of a succession of surges or pulsations, the velocity and pressure intensity of which varies with the speed of operation and the character of the device with which it is being used. In the case of a scavenging pump supplying air to the intake of an internal combustion engine, the pulsations are of relatively great violence. Surges traveling in a backward direction are also present, caused by reflection at the engine or other device, and there is rapid backward and forward motion, or oscillating flow, of the surges, involving the actual translational displacement of the air.

When an air filter is attached to the intake of the engine, etc. there is an intermittent rapidly reversing flow of air through the filter as a result of the action described heretofore, and this results in a mechanical disturbance which interferes with the effective operation of the filter, and the efficiency of the filter is reduced materially from that which is realized when the flow of air is steady. The action described also produces considerable noise.

In the apparatus of the present invention, such interference is reduced to a very substantial degree, such that the effectiveness of the filter is not impaired to any appreciable extent, and the noises are effectively quieted. The pulsating air enters by way of the inlet opening 18 and the snout 22 and passes through conduit 21 and into the chamber 16. By reason of the fact that the portion of conduit 21 within chamber 17 is imperforate, none of the air passes from conduit 21 into said chamber, and chamber 16 is the first snubbing chamber in the path of the air through the device. Because the portion of conduit 21 within chamber 16 is apertured, the air diffuses laterally through the apertures and also passes out through the open end of the conduit into the chamber 16. The air freely expands into substantially the entire volume of chamber 16. A restriction is offered to the passage of the air through the filters 29 and 30 by reason of the porous character of the latter. Such restriction serves to hold the pressure surge in the chamber 16 momentarily while expansion throughout the volume of the chamber takes place and produces a substantial reduction in pressure. The net result is a checking or snubbing effect upon the surges, which is quite effective in suppressing the pulsations and producing a smooth flow of air.

In the absence of the snubbing construction in chamber 16, a condition of alternating pressure is set up, in which the pressure alternates between compression and rarefaction, while with the snubbing construction there is the single incoming pressure surge, followed by a relatively gradual reduction of pressure.

From the chamber 16, the air passes laterally through the retaining members 35 and 36 of the filters 29 and 30, and the filtering bodies 39 thereof and into the conduits 25 and 26. The dust and dirt particles are removed from the air by filtering bodies 39. The air then diffuses through the apertures in conduits 25 and 26, and passes out of the open ends of said conduits and into the chamber 17, whence it passes to the outlet opening 40 and into the engine, pump, blower, etc. The pulsations traveling backwardly from the engine expand into the chamber 17 upon their emergence from the opening 40, and experience a restraining action in passing into the conduits 25 and 26. Such restraint holds the pressure pulsation of air momentarily while expansion throughout the volume of the chamber takes place and produces a substantial reduction in pressure. The net result is a snubbing effect in the chamber 17 upon the backwardly traveling pulsations, such that they are suppressed and relatively little air passes backwardly through the filters. In the absence of the snubbing construction, such surges would rush violently or "snap" through the filters in a backward direction and interfere with the effective operation of the filters.

The resultant flow of air in the device is forwardly to the engine or other device, and the net result accomplished by the construction of the invention is a quieting of the intake noises and a relatively smooth flow of air forwardly through the filters, with maximum filtering effectiveness. In addition, the suppression of the forwardly and backwardly moving pulsations results in a quieting of the intake noises and the air passes through them in a forward direction in a substantially steady stream, and the filters function with maximum effectiveness. In addition, from the structural standpoint, the apparatus is simple and economical.

The apparatus shown in Figs. 5, 6 and 7 consists of a cylindrical shell 50 which is adapted for arrangement with its longitudinal axis extending vertically. Shell 50 has a transverse partition 53 which divides the interior of the shell into snubbing chambers 54 and 55. The end wall 51 has an inlet opening 57 therein and the partition 53 has an opening 58 therein in alignment with opening 57. A conduit 59 is connected to the inlet opening 57 and passes through opening 58 and extends into the chamber 54 and stops short of end wall 52. The portion of conduit 59 located within chamber 55 is surrounded by an imperforate cylindrical shell 61, and the space between conduit 59 and shell 61 is filled with a porous sound absorbing and gas pressure absorbing material 62 which may be composed of vegetable or metal fibers or any other suitable sound absorbing and gas pressure absorbing material. The portion of conduit 59 which is surrounded by the shell 61 is apertured or foraminous for the passage of sound and gas therethrough, and the portion which extends into chamber 54 is also apertured. A snout 63 may be arranged upon the end of conduit 59 passing through opening 57 if desired, and is adapted to be connected to an external conduit (not shown) for the conveyance of air to the device.

An additional opening 64 is provided in partition 53, and a snout 66 is connected to said opening and projects a short distance into chamber 54. Upon the end of snout 66 within the chamber 54, a filter 67 is mounted. The filter 67 may be constructed and arranged upon the snout 66 in a manner similar to that described in connection with the filters 29 and 30 and their mounting upon the conduits 25 and 26 in the apparatus of Figs. 1 to 4. The cylindrical wall of shell 50 is provided with an opening 68 communicating with chamber 54 and adapted for the insertion and removal of the filter 67. A panel or door 69 is provided for opening 68 and is removably held in place by means of the bolts 71.

An additional opening 72 is provided in end wall 51, and a conduit 73 is connected to the said opening and extends into chamber 55 and stops short of partition 53. A flanged snout 74 may be attached to the end of conduit 73 and projects exteriorly of the device for connection to the intake of the engine, pump, blower, etc. Conduit 73 is apertured, the shape, size and aggregate area of apertures being similar to that described heretofore in connection with the apertured conduits of the device of Figs. 1, 2 and 3. As is shown in Figs. 6 and 7, the conduit 73 is in non-alignment with the snout 66 and filter 67.

In the operation of the apparatus of Figs. 5, 6 and 7, the snout 74 is connected to the intake of the engine or other device. The air enters at inlet opening 57 and passes into the conduit 59 and within the first portion of said conduit undergoes a partial dissipation of sound and mechanical pulsations by reason of being exposed to the sound absorbing and gas pressure absorbing material 62. The sound and air pulsations pass through the apertures of this portion of the conduit and enter the porous absorbing material 62 where a portion of the vibratory energy is dissipated. The value of the absorbing material 62 is greater where vibrations of a relatively high frequency are present.

After passing through the first portion of conduit 59, the air enters the second apertured portion, and undergoes an action similar to that described in connection with the action of the air in the chamber 16 of the device of Figs. 1 to 4. After passing through the filter 67, the air passes through snout 66 and opening 64 and enters the chamber 55. It then passes into the conduit 73 through the apertures and open end thereof, and thence passes through snout 74 and into the engine, etc. The pulsations travelling backwardly from the engine enter the device by way of snout 74 and conduit 73 and pass out of said conduit through the apertures and open end thereof and expand into the volume of chamber 55, and by reason of such expansion undergo a substantial suppression of their velocity and pressure intensity. In this way, the surging or pulsing of air through the filter in a backward direction is reduced, and the interference with the filtering action is avoided. The resultant flow of air is forwardly to the engine and it flows in a relatively steady stream.

While but two embodiments of the invention have been described and illustrated, these are by way of example, and the invention is not limited thereto and other changes and modifications may be made within the scope of the invention as the same is defined in the appended claims.

What is claimed is:

1. Apparatus for silencing and filtering noise-producing pulsating gases, comprising a cylindrical shell, a transverse partition in said shell dividing the interior thereof into a first chamber and a second chamber, said partition and the end wall of said shell enclosing said second chamber each having an opening therein, a conduit connecting said two openings and passing through said second chamber and extending into said first chamber and stopping short of the wall of said first chamber opposite said partition, the portion of said conduit in said second chamber being imperforate and the portion of said conduit in said first chamber being apertured-walled, said partition having at least one additional opening therein, a cylindrical gas filter connected to said last mentioned opening and extending into said first chamber, said filter being arranged across the path of gases passing through said last mentioned opening, an open-ended, apertured-walled conduit connected to said last mentioned opening and extending into said second chamber and stopping short of the wall of said second chamber opposite from said partition, said shell having a second opening therein providing an outlet for said second chamber, said shell having a third opening therein communicating with said first chamber, said filter being transportable through said third opening, and a removable cover for said third opening.

2. Apparatus for silencing and filtering noise-producing pulsating gases, comprising a shell, a partition in said shell dividing the interior thereof into a first chamber and a second chamber, said partition and a wall of said shell enclosing said second chamber each having an opening therein, a conduit connecting said two openings and passing through said second chamber and extending into said first chamber and stopping short of the wall of said first chamber opposite said partition, the wall of said conduit being apertured and the portion thereof in said second chamber having sound absorbing and gas pressure absorbing material associated therewith, said partition having at least one additional opening therein, a gas filter connected to said last mentioned opening and extending into said first chamber, said filter being arranged across the path of gases passing through said last mentioned opening, said shell having a second opening therein providing an outlet for said second chamber, an open-ended apertured-walled conduit connected to said outlet opening and extending into said second chamber and stopping short of the wall of said second chamber opposite from said outlet opening, said shell having a third opening therein communicating with said first chamber, said filter being transportable through said third opening, and a removable cover for said third opening.

3. Apparatus for silencing and filtering noise-producing pulsating gases, comprising a shell, a transverse partition in said shell dividing the interior thereof into a first chamber and a second chamber, said partition and the end wall of said shell enclosing said second chamber each having an opening therein, conduit means connecting said two openings and passing through said second chamber and extending into said first chamber and stopping short of the wall of said first chamber opposite said partition, the wall of the portion of said conduit means in said second chamber being impervious to the passage of gas therethrough and the wall of the portion of said conduit means in said first chamber being pervious to the passage of gas therethrough, said partition having at least one additional opening therein, a gas filter connected to said last mentioned opening and extending into said first chamber, said filter being arranged across the path of gases passing through said last mentioned opening, an open-ended apertured-walled conduit connected to said last mentioned opening and extending into said second chamber and stopping short of the wall of said second chamber opposite from said partition, said shell having a second opening therein providing an outlet for said second chamber, said shell having a third opening therein communicating with said first chamber, said filter being transportable through said third opening, and a removable cover for said third opening.

4. Apparatus for silencing and filtering noise-producing pulsating gases, comprising a shell, a partition in said shell dividing the interior thereof into a first chamber and a second chamber, the end wall of said shell enclosing said second chamber having an opening therein, conduit means connected to said opening and passing through said second chamber and said partition and extending into said first chamber and stopping short of the wall of said first chamber opposite said partition, the construction of the portion of said conduit means in said second chamber being such that gases therein are confined against passage into said second chamber and the portion of said conduit means in said first chamber being apertured-walled, said partition having at least one additional opening therein, a gas filter connected to said last mentioned opening and extending into said first chamber, said filter being arranged across the path of gases passing through said last mentioned opening, an open-ended apertured-walled conduit connected to said last mentioned opening and extending into said second chamber and stopping short of the wall of said second chamber opposite from said partition, said shell having a second opening therein providing an outlet for said second chamber.

5. Apparatus for silencing and filtering noise-producing pulsating gases, comprising wall means forming two juxtaposed chambers, the second of said chambers having inlet and outlet openings for said apparatus, a conduit connected to said inlet opening and passing through said second chamber and extending into the first chamber and stopping short of the wall of said first chamber opposite said second chamber, the portion of said conduit in said second chamber being so constructed that gases therein are confined against passage into said second chamber and the portion of said conduit in said first chamber being apertured-walled, said first chamber forming means having at least one additional opening therein providing communication between said chambers, a gas filter connected to said last mentioned opening and extending into said first chamber, said filter being arranged across the path of gases passing through said last mentioned opening, and an open-ended apertured-walled conduit connected to said last mentioned opening and extending into said second chamber and stopping short of the wall of said second chamber opposite from said first chamber.

6. Apparatus for silencing and filtering noise-producing pulsating gases comprising means forming two juxtaposed chambers, an open-ended conduit passing through the second of said chambers and extending into the first chamber and stopping short of the wall of said first chamber opposite said second chamber, the portion of said conduit in said second chamber being so constructed that gases therein are confined against passage into said second chamber and the portion of said conduit in said first chamber being apertured-walled, said chamber forming means having at least one opening therein providing communication between said chambers, a gas filter connected to said last mentioned opening and extending into said first chamber, said filter being arranged across the path of gases passing through said last mentioned opening, an open-ended apertured-walled conduit connected to said last mentioned opening and extending into said second chamber and stopping short of the wall of said second chamber opposite from said first chamber, said second chamber having an additional opening therein forming an outlet for said second chamber.

7. Apparatus for silencing and filtering noise-producing pulsating gases comprising means forming two juxtaposed chambers, the first of said chambers having an inlet opening therein, an open-ended apertured conduit connected to said inlet opening and extending into said first chamber and stopping short of the wall of said first chamber opposite said inlet opening, said chamber forming means having at least one opening therein providing communication between said chambers, a gas filter connected to said last mentioned opening and extending into said first chamber, said filter being arranged across the path of gases passing through said last mentioned opening, an open-ended apertured-walled conduit connected to said last mentioned opening and extending into the second chamber and stopping short of the wall of said second chamber opposite from said first chamber, said second chamber having an additional opening therein forming an outlet for said second chamber.

8. Apparatus for silencing and filtering noise-producing pulsating gases comprising wall means forming two juxtaposed chambers, an open-ended conduit passing through the second of said chambers and extending into the first chamber and stopping short of the wall of said first chamber opposite said second chamber, the portion of said conduit in said second chamber being so constructed that gases therein are confined against passage into said second chamber and the portion of said conduit in said first chamber being apertured-walled, said second chamber having at least one opening in a wall thereof providing communication between said first and second chambers, a gas filter connected to said opening and extending into said first chamber, said filter being arranged across the path of gases passing through said opening, said second chamber having at least one opening in a second wall thereof forming an outlet for said second chamber, and an open-ended apertured conduit connected to the opening in one of said walls of said second chamber and extending into said second chamber and stopping short of the opposite wall of said second chamber.

9. Apparatus for silencing and filtering noise-producing pulsating gases comprising means forming two juxtaposed chambers, the first of said chambers having an inlet opening therein, an open-ended apertured conduit connected to said inlet opening and extending into the said first chamber and stopping short of the wall of said first chamber opposite said inlet opening, said chamber forming means having at least one opening therein providing communication between said chambers, a gas filter connected to said last mentioned opening and extending into said first chamber, said filter being arranged across the path of gases passing through said last mentioned opening, the second of said chambers having at least one outlet opening in a wall thereof, and an open-ended apertured conduit connected to said outlet opening of said second chamber and extending into said second chamber and stopping short of the opposite wall of said second chamber.

10. Apparatus for silencing and filtering noise-producing pulsating gases comprising means forming first and second chambers having a common wall therebetween, an inlet conduit having an apertured portion extending and opening into said first chamber, said common wall having an opening therein, a gas filter within said first chamber having the upstream surface thereof exposed to the space within said first chamber, conduit means for connecting the downstream surface of said filter with said opening, said second chamber having a second opening therein, and pulsation-snubbing means within said second chamber, said pulsation-snubbing means including an apertured conduit extending and opening into said second chamber from one of said openings in the walls thereof.

11. Apparatus in accordance with claim 10 wherein said gas filter is cylindrical in form.

HELMUT A. DIETRICH.

REFERENCES CITED

The following references are of record in the file of this patent:

UNITED STATES PATENTS

| Number | Name | Date |
| --- | --- | --- |
| 425,637 | Shipman | Apr. 15, 1890 |
| 929,656 | Coles | Aug. 3, 1909 |
| 2,037,884 | Day | Apr. 21, 1936 |
| 2,050,581 | Orem | Aug. 11, 1936 |